United States Patent [19]
Torrielli et al.

[11] Patent Number: 5,161,633
[45] Date of Patent: Nov. 10, 1992

[54] VEHICLE SPEED CONTROL SYSTEM

[75] Inventors: Vittorino Torrielli; Fabio Giavarini, both of Turin, Italy

[73] Assignee: Fiat Auto S.p.A., Italy

[21] Appl. No.: 517,214

[22] Filed: May 1, 1990

[30] Foreign Application Priority Data

May 3, 1989 [IT] Italy .............................. 53059/89[U]
Apr. 10, 1990 [IT] Italy .............................. 52957/90[U]

[51] Int. Cl.$^5$ ............................................. B60K 31/04
[52] U.S. Cl. ................................... 180/170; 123/400; 180/179; 364/426.04
[58] Field of Search ............... 180/177, 170, 178, 179; 123/400, 399, 361; 364/426.04

[56] References Cited

U.S. PATENT DOCUMENTS

| | | | |
|---|---|---|---|
| 3,368,640 | 2/1968 | Bremer et al. | 180/177 |
| 3,476,205 | 11/1969 | Kato | 180/179 |
| 4,360,089 | 11/1982 | Matsui et al. | 180/170 |
| 4,367,805 | 1/1983 | Totani et al. | 180/179 |
| 4,725,969 | 2/1988 | Onogi et al. | 180/179 |
| 4,779,592 | 10/1988 | Takeuchi et al. | 123/399 |
| 4,856,477 | 8/1989 | Hanaoka et al. | 123/400 |
| 4,914,597 | 4/1990 | Moncelle et al. | 180/179 |

FOREIGN PATENT DOCUMENTS

| | | |
|---|---|---|
| 234490 | 2/1987 | European Pat. Off. . |
| 0234490 | 11/1988 | European Pat. Off. . |
| 396088 | 11/1990 | European Pat. Off. ............ 180/179 |
| 1214103 | 4/1966 | Fed. Rep. of Germany . |
| 3727219 | 3/1988 | Fed. Rep. of Germany . |
| 0100455 | 1/1986 | PCT Int'l Appl. . |

*Primary Examiner*—Eric D. Culbreth
*Attorney, Agent, or Firm*—Quarles & Brady

[57] ABSTRACT

A system for controlling the speed of a vehicle featuring a throttle valve controlling a feed device on the vehicle and counteracted by an elastic return spring. The system consists of an electromechanical actuator designed to generate a torque as a function of its supply voltage; and an electronic control unit connected to a speed sensor and designed to vary the supply voltage to the actuator. The actuator operates an arm connected mechanically to the throttle valve via drive elements, and is designed to generate on the throttle valve a predetermined torque capable of counteracting that generated by the elastic return spring subsequent to rotation of the throttle valve via operation of the accelerator pedal on the vehicle.

12 Claims, 4 Drawing Sheets

VEHICLE SPEED CONTROL SYSTEM

BACKGROUND OF THE INVENTION

The present invention relates to a system for controlling the cruising speed of a vehicle, the instantaneous speed of which depends on the degree of opening of a throttle valve on the vehicle feed system, e.g. the fuel throttle or a throttle-controlled body on the injection system.

Particularly on long journeys or when strict speed limits apply, considerable advantage is afforded by automatic devices designed to maintain a predetermined speed with no action required by the driver on the accelerator pedal. Various types of such devices, commonly referred to as "cruise controls", are known:

Patent application No. EP-A-0234490 relates to a device featuring a geared motor for controlling both opening and closing of the throttle. This device is both complex and expensive, due to two-way operation of the electric motor for opening and closing the throttle, and the potentiometer employed for controlling the motor.

U.S. Pat. No. 4,725,969 relates to a similar device, i.e. featuring a geared motor for both opening and closing the throttle, but which also features a delicate high-cost electromagnetic clutch for disabling the system.

Pat. No. DE-B-1214103 relates to a further device featuring a geared motor for controlling both opening and closing of the throttle, as well as complex high-cost components such as a potentiometer and electromagnetic clutch.

In addition to those mentioned above, a major drawback of known powered devices of the aforementioned types is that, in the event of power failure to the geared motor, and in the absence of an electromagnetic clutch, the throttle may lock or at any rate become difficult to operate directly via the accelerator pedal, the danger of which in terms of driving safety is only too obvious.

SUMMARY OF THE INVENTION

The aim of the present invention is to provide a system of the aforementioned type for controlling the instantaneous speed of a vehicle, but which is straightforward and cheap to produce, while at the same time enabling correct operation of the accelerator pedal in the event of power failure to the geared motor.

With this aim in view, according to the present invention, there is provided a system for controlling the speed of a vehicle featuring a feed device having a throttle valve opened by the vehicle accelerator pedal against the action of elastic return means connected to said throttle valve and designed to generate a counteracting elastic torque on the same; characterized by the fact that it comprises an electromechanical actuator designed to generate a variable calibrated torque; and an electronic control unit connected at least to a speed sensor for detecting the instantaneous speed of the vehicle, and designed to vary the torque generated by said actuator; said actuator cooperating with a member connected mechanically to said throttle valve, so as to generate, on said throttle valve, a torque determined by said control unit and in opposition to said counteracting elastic torque.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
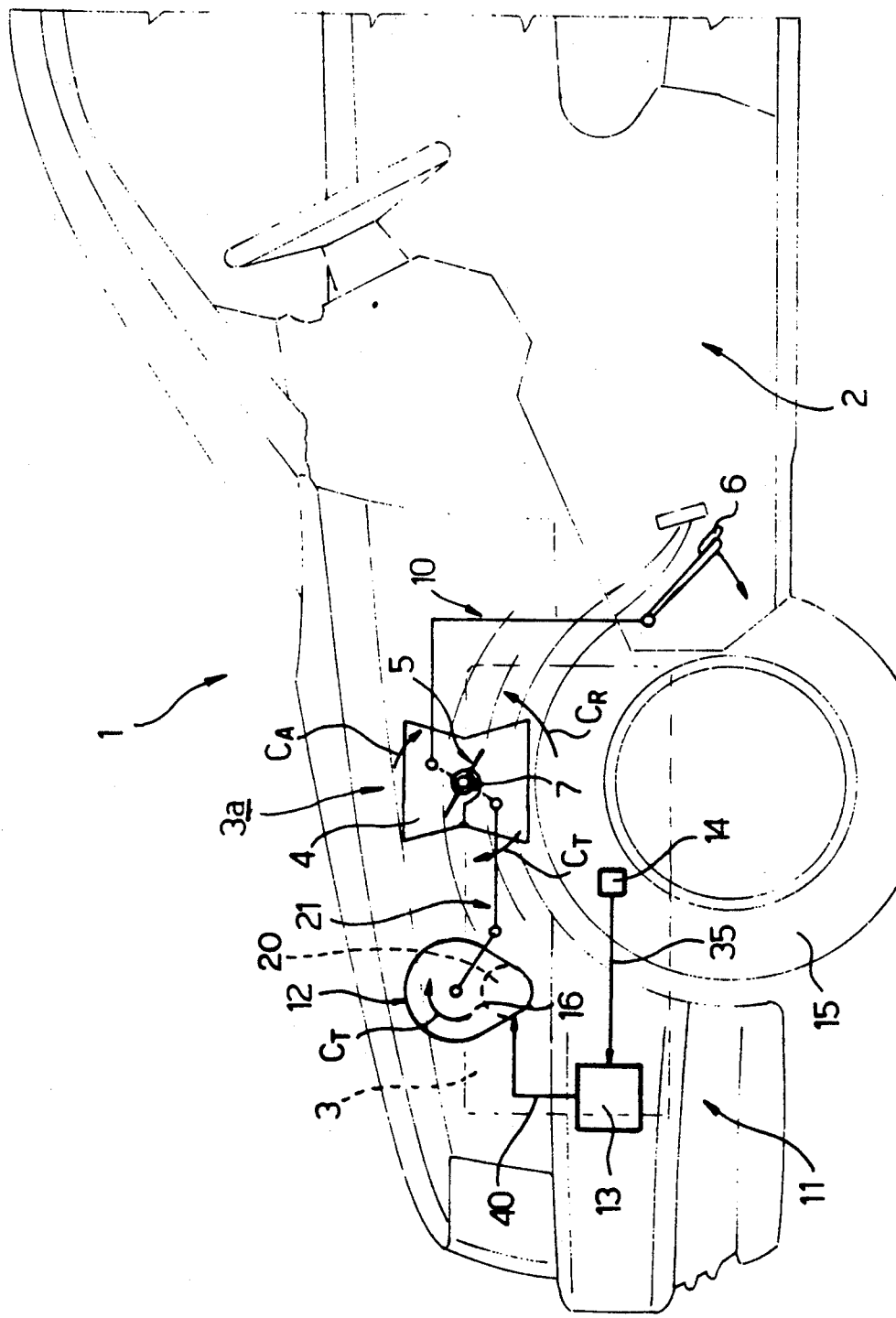
FIG. 1 shows a schematic view of a vehicle featuring a speed control system in accordance with the present invention.
Figure 2:
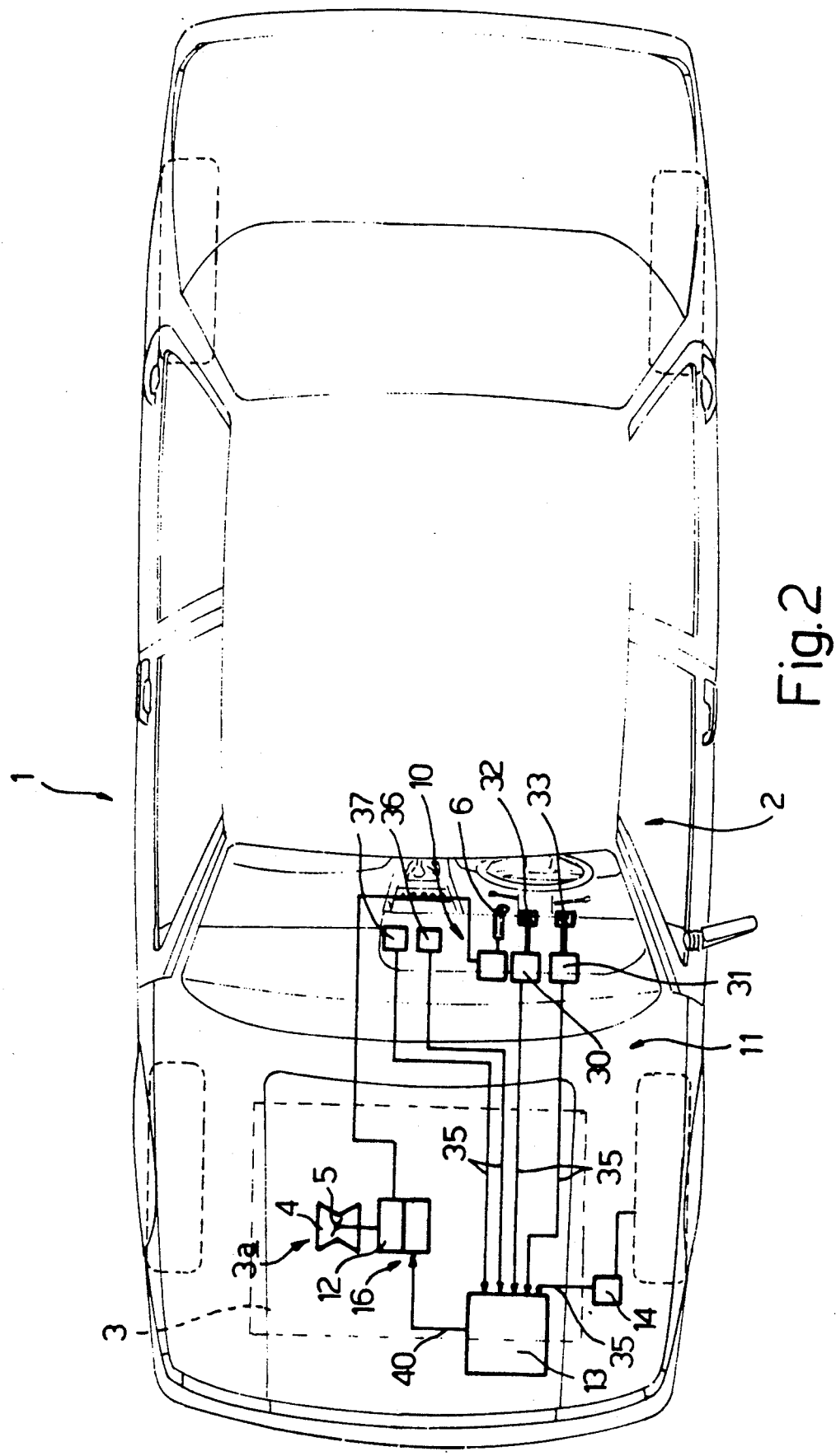
FIG. 2 shows a top plan view of the FIG. 1 vehicle featuring the speed control system according to the present invention.

Number 1 in FIGS. 1 and 2 indicates any known type of vehicle, in the example shown, a motor vehicle, having a passenger compartment 2 and an engine 3 indicated schematically by the dotted line. Engine 3 is supplied in known manner by a known carburetor 4 having a known throttle valve 5 opened in known manner by an accelerator pedal 6 against the action of elastic return means 7 shown schematically as a spiral spring and connected, in known manner, mechanically integral with throttle valve 5 for generating on the same a counteracting elastic torque $C_R$ in opposition to the operating torque $C_A$ produced in known manner on throttle valve 5 by the user depressing accelerator pedal 6 in the direction of the arrow (FIG. 1), e.g. via a known cable and link drive indicated schematically and as a whole by number 10.

According to the present invention, vehicle 1 presents a vehicle speed control system 11 designed to automatically maintain a constant predetermined vehicle speed with no recourse to accelerator pedal 6 by the user. Said control system (FIG. 1) substantially comprises an electromechanical actuator 12 for generating a variable calibrated torque $C_T$; and an electronic control unit 13 connected at least to a speed sensor 14, e.g. located on wheel 15 of vehicle 1, for determining the instantaneous speed of the same. Said control unit 13, e.g. a known programmable microprocessor type, is designed, according to a preset program memorized, for example, in a ROM, to vary the torque CT generated by actuator 12. According to the present invention, actuator 12 is connected mechanically to throttle valve 5 so as to transmit torque $C_T$ to the same, said torque $C_T$ being determined by control unit 13 and acting in opposition to the counteracting elastic torque $C_R$ generated by elastic means 7. Electromechanical actuator 12 is defined by a known geared motor 16 designed to generate a torque proportional to its supply voltage; and by a voltage variator 20, e.g. built into gear motor 16, for supplying the same. Electronic control unit 13 is thus designed to vary the supply voltage to actuator 12 in proportion to the vehicle speed detected by sensor 14, in the example shown by acting on voltage variator 20, which it controls directly over line 40.

Throttle valve 5 is connected on opposite sides to actuator 12 and accelerator pedal 6, so that torque $C_T$ generated by actuator 12 and transmitted by the same to the rotation shaft of throttle valve 5 acts in the same direction as torque $C_A$ generated by operation of accelerator pedal 6, but with no interference between the two, i.e. in such a manner that both torques $C_T$ and $C_A$ act in the same direction but on opposite sides of throttle valve 5. For this purpose, actuator 12 is connected angularly integral with both throttle valve 5 and said elastic return means 7. For example, actuator 2 may be connected to throttle valve 5, parallel to pedal 6, by means of a link and cable drive 21 of the same type as 10, or, if enough space is available, by a known coupling (not shown) formed on the throttle valve 5 spindle as shown schematically in FIG. 2. Elastic means 7 are also connected integral with the spindle of throttle valve 5, or directly to the common end portion of the linkage system defining drives 10 and 21.

Again with reference to FIG. 2 illustrating the complete embodiment of control system 11 according to the present invention, in addition to sensor 14 and control unit 13 with actuator 12, said system 11 also comprises operating sensors 30 and 31 connected to control unit 13 over respective lines 35 and designed to respectively detect operation of brake pedal 32 and clutch pedal 33 of vehicle 1. Sensor 14 is also connected to control unit 13 over a line 35, and further lines 35 are provided for connecting to control unit 13 a control 36, e.g. a switch, for turning control unit 13 on and off and located for easy access by the user inside passenger compartment 2, and a known memory element 37 for memorizing the instantaneous speed of vehicle 1 when control unit 13 was last turned on or off by control 36. If necessary, memory element 37 may also be set manually to a series of predetermined values by means of a known built-in selector (not shown), in which case, memory element 37, together with the selector, is housed inside passenger compartment 2 alongside control 36.

Control unit 13 is programmed or wired so as to disable electromechanical actuator 12 (i.e. zero the supply voltage to geared motor 16 by acting on variator 20) subsequent to both indication/operation of sensors 30, 31, and operation of control 36. Control unit 13 is also designed to read and compare the value memorized and/or set on memory element 37 with the value received from sensor 14, and to act accordingly on variator 20 until the opening angle of throttle valve 5 set by actuator 12 is such that the value detected by sensor 14 equals that memorized in memory element 37.

Operation of speed control system 11 is as follows. Pedal 6 is first depressed by the user to open throttle valve 5 and bring vehicle 1 up to the required speed to be maintained, at which point, with pedal 6 still depressed, control unit 13 is turned on by means of control 36. At this point, pedal 6 may be released, and vehicle 1 will continue running at the speed attained when control unit 13 was switched on, regardless of any change in the type of terrain involved (flat, uphill, downhill, etc.). In fact, as soon as it is turned on, control unit 13 reads the instantaneous speed value of vehicle detected by sensor 14 and, in real time, regulates the supply voltage to geared motor 16 in such a manner as to cause actuator 12 to generate on throttle valve 5 a torque $C_T$ exactly equal to torque $C_R$ formerly opposing throttle valve 5 when control 36 was operated. Regardless of whether pedal 6 is operated by the user, the speed of vehicle 1 is maintained as set by virtue of operating torque $C_A$ produced by pedal 6 being replaced by torque $C_T$ generated by actuator 12. In the event of vehicle 1 encountering road or environmental conditions causing it to accelerate or decelerate from the speed it was running at when system 11 was activated, and which was memorized in memory element 37 subsequent to control unit 13 first reading the value of sensor 14, this is immediately detected by sensor 14, with the result that control unit 13, in accordance with the set program, provides for varying torque $C_T$ in inverse proportion to the variation in speed.

That is to say, if the speed of vehicle 1 increases, torque $C_T$ is reduced to less than counteracting elastic torque $C_R$, and throttle valve 5 closes, thus reducing fuel supply to engine 3 and so slowing down vehicle 1. Closure of throttle valve 5, however, also results in a reduction of torque $C_R$, by virtue of said torque $C_R$ being produced by elastic means deformed in proportion to the opening of throttle valve 5. A state of equilibrium is thus rapidly restored wherein torques $C_R$ and $C_T$ are equal. Upon termination of the transient speed determining the feedback response cycle of system 11, which is totally undetectable by the user, vehicle 1 again proceeds at the same speed set by the user via pedal 6. The same cycle, only in reverse, is also activated by control unit 13 in the event of vehicle 1 slowing down in relation to the speed set by system 11. In this case, upon detecting the fall in speed by reading the value of sensor 14 and memory element 37 (or, preferably, an internal register on control unit 13 in which the speed value recorded in element 37 is also memorized), control unit 13 acts on actuator 12 so as to increase torque $C_T$, open throttle valve 5 and so bring vehicle 1 back up to the initial speed.

During operation of control unit 13, the user may of course accelerate vehicle 1 without disconnecting system 11, i.e. for overtaking, by simply depressing pedal 6, effect of which is to restore torque $C_A$ which, on exceeding torques $C_R$ and $C_T$, opens throttle valve 5 thus accelerating the vehicle. Even in the event of control unit 13 detecting said voluntary acceleration via sensor 14 and consequently zeroing torque $C_T$, acceleration continues by virtue of the counteracting torque produced by elastic means 7 being overcome by operating torque $C_A$ which prevails over all the others. Upon completion of the manoeuvre requiring acceleration of vehicle 1, pedal 6 is simply released for eliminating torque $C_A$ and so enabling control unit 13 to restore the original speed as already described. In the event of braking or gear shifting (in the absence of an automatic transmission), sensors 30 and 31 are activated, thus disconnecting control unit 13 and system 11, and torque $C_T$ is eliminated so that vehicle speed again depends on the pressure exerted by the user on pedal 6. When system 11 is turned back on, the user may choose whether to set the required cruising speed using pedal 6 as already described, or to set it automatically by control unit 13 reading the speed value stored in memory element 37. Such selection may be made via forced reading of element 37 when system 11 is turned on, by suitably designing control 36 and/or providing element 37 with a control button. Instead of being activated and set semiautomatically as described, i.e. by setting the required cruising speed via pedal 6, system 11 may obviously also be activated and set fully automatically, e.g. by providing element 37 with a selector for manually memorizing a speed value and forcing reading of the same by control unit 13 when control system 11 is turned on.

Figure 4:
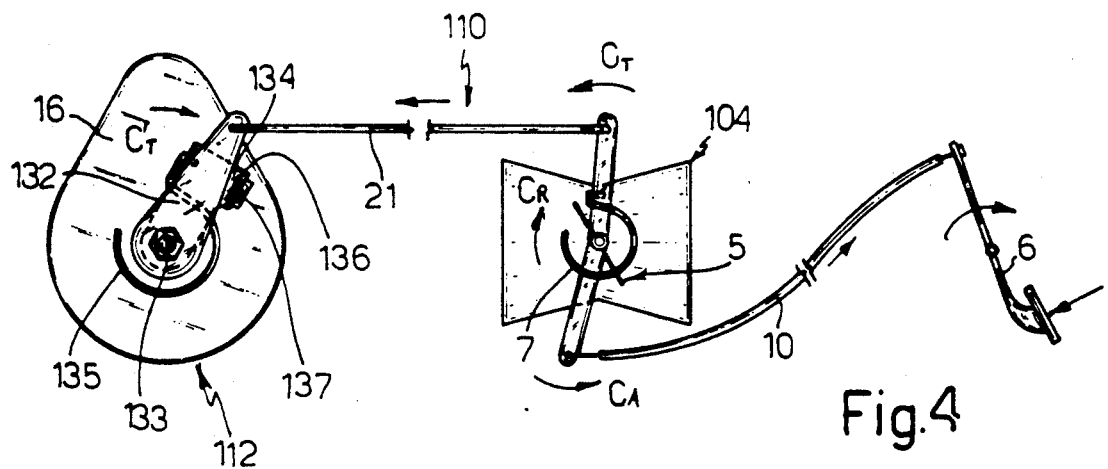
FIG. 4 shows a first embodiment of the mechanical part of the FIG. 3 device.
Figure 3:
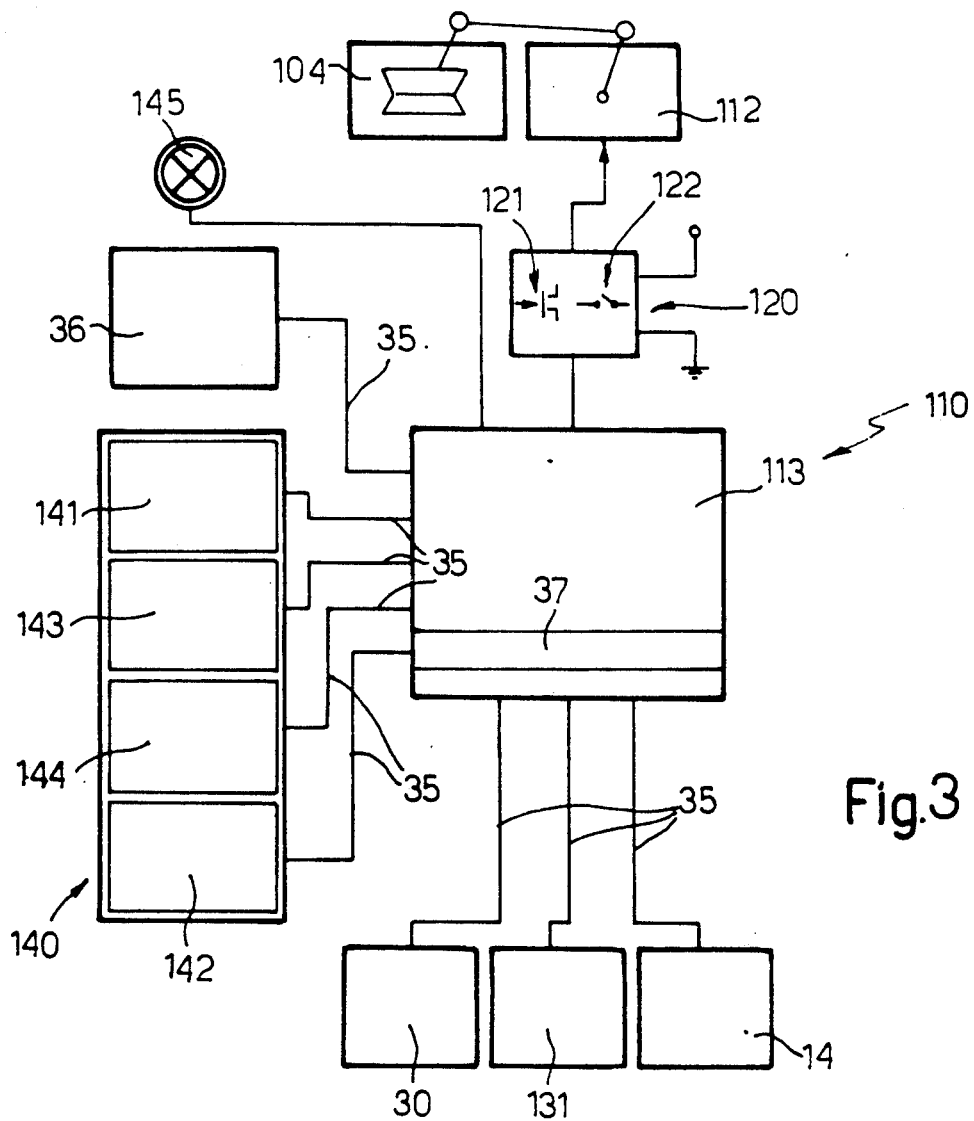
FIG. 3 shows a schematic block diagram of the device according to the present invention.

Number 110 in FIGS. 3 and 4 indicates a perfected device similar to device 11 described above, any details similar or identical to those already described being indicated using the same numbering system. Device 110 is suitable for fitting to a vehicle 1 (not shown) featuring a known type of feed device 104 (in the example shown, a carburetor, or a throttle-controlled body on the injection system) controlled by the setting of a known throttle valve 5. Said throttle valve 5 is opened in known manner by an accelerator pedal 6 against the action of elastic return means 7 (shown schematically in the form of a spiral spring) connected in known manner mechanically integral with throttle valve 5, and designed to generate on the same a counteracting elastic torque $C_R$ in opposition to the operating torque $C_A$ produced in known manner on throttle valve 5 by the pressure exerted in the direction of the arrow (FIG. 4) on pedal 6 connected to throttle valve 5 by drive 10.

As in the case of system or device 11, control system 110 is designed to automatically maintain a predetermined cruising speed of vehicle 1 with no recourse to pedal 6 by the user, and substantially comprises an electromechanical actuator 112 for generating a variable calibrated torque $C_T$, and an electronic control unit 113 connected at least to a speed sensor 14. As in the case of control unit 13, control unit 113 is designed, according to a preset program memorized, for example, in a ROM, to vary the torque $C_T$ generated by actuator 112. According to the present invention, said actuator 112 co-operates, as described in more detail later on, with an element 132 connected mechanically to throttle valve 5 so as to transmit to the same the torque $C_T$ generated by actuator 112, determined by control unit 113 as described later, and in opposition to the counteracting elastic torque $C_R$ generated by elastic means 7.

Electromechanical actuator 112 is defined by a known geared motor 16 designed to generate a torque proportional to its mean supply voltage, which is varied by control unit 113 via a control circuit 120 (shown schematically in block form) as a function of the vehicle speed detected by sensor 14. In the example shown, circuit 120 is controlled by control unit 113 using the PWM (pulse width modulation) method, and comprises a known field-effect power transistor 121 and a relay 122, both shown only schematically inside block 120 with no indication of the circuit connections which are obvious to any technician skilled in the field.

Throttle valve 5 is connected on opposite sides to actuator 112 and accelerator pedal 6 by means of a rocker arm, so that torque $C_T$ generated by actuator 112 and transmitted by element 132 to the rotation shaft of throttle valve 5 acts in the same direction as torque $C_A$ generated by operation of accelerator pedal 6 and with no interference between the two, i.e. in such a manner that torques $C_T$ and $C_A$ act in the same direction but on opposite sides of throttle valve 5. For this purpose, element 132 is connected angularly integral with both throttle valve 5 and said elastic return means 7. In the example shown, actuator 112 turns an output shaft 133 fitted angularly integral with an arm 134. Parallel to arm 134, shaft 133 is also fitted in idle manner with element 132 consisting of an arm similar to 134. The latter is counteracted by a return spring 135, and presents a shoulder 136, one side of which is secured by spring 135 so as to cooperate with arm 132. A fixed shoulder 137 integral with the casing of unit 16 acts as a limit stop for the arm 134-shaft 133 assembly, against which limit stop unit 16, when deactivated, is secured by spring 135. When turned by actuator 112 subsequent to generation of torque $C_T'$, shaft 133 turns arm 134 against the action of spring 133, which arm 134, via shoulder 136, causes idle arm 132 to turn together with shaft 133 and in the same direction as torque $C_T'$ produced by geared motor 16.

Arm 132 is in turn connected to throttle valve 5, parallel to pedal 6, by a link and cable drive 21 similar to 10, or, if sufficient space is available, by a known coupling (not shown) formed on the throttle valve 5 spindle, so as to enable actuator 112 to be assembled directly on to feed device 104. Elastic means 7 are also connected integral with said throttle valve 5 spindle, or directly to the common end portion of the linkage system defining drives 10 and 21.

As shown in FIG. 3, in addition to sensor 14 and control unit 113 with actuator 112, control system 110 according to the present invention also comprises at least two more sensors, a sensor 30 for detecting operation of the brake pedal of the vehicle featuring device 110, and a sensor 131 for detecting the speed of the engine supplied by device 104, both said sensors 30 and 131 being connected to control unit 113 over respective data lines 35. Sensor 14 is also connected to control unit 113 over a line 35, and further lines 35 provide for connecting to control unit 13 a control 36, e.g. a switch for turning device 110 on and off, and the respective pushbutton switches of a control panel 140, both located inside the passenger compartment of the vehicle. Said panel 140 presents a first set button 141, a reset button 142 and, if necessary, two control buttons 143 and 144. Once device 110 is turned on by button 36, button 141 provides for activating control unit 113 and, consequently, actuator 112. Subsequent to a transient state temporarily deactivating device 110, button 142 provides for resetting the cruising speed the vehicle was formerly traveling at when device 110 was deactivated, which speed is detected by sensor 14 and stored in a special register in memory 37 of control unit 113. As shown later on, buttons 143 and 144 provide for permanently varying the cruising speed of the vehicle without recourse to pedal 6. Connection of device 110 via button 36 may also turn on an optional indicator 145, e.g. a LED, located on the dash panel of the vehicle.

Control unit 113 is programmed or wired so as to disconnect electromechanical actuator 112 (by zeroing the supply voltage to geared motor 16 either by opening safety relay 122 or disabling transistor 121 series connected to the motor supply circuit of geared motor 16) both on the basis of the signals received from sensors 14, 30 and 131, and subsequent to operation of control 36. Control unit 113 is also designed to read and process the values stored in register 37 and other similar registers (not shown), and to disable or enable transistor 121, series connected to the supply circuit of unit 16, on the basis of an instantaneous vehicle speed reading by sensor 14, as well as on the basis of vehicle acceleration and its derivative, so as to control the opening of throttle valve 5 via actuator 112 in such a manner that the reading of sensor 14 is made and maintained equal to that stored in register 37. Operation of speed control system 110 is the same as already described in connection with system 11. After bringing the vehicle up to the required cruising speed by means of pedal 6 and subsequently connecting system 110 via switch 36 (which lights up LED 145), the user presses button 141 for enabling control unit 113 and so maintaining a constant vehicle speed, at which point, pedal 6 may be released. When button 141 is pressed, control unit 113 memorizes the instantaneous vehicle speed reading by sensor 14 in register 37, and, in real time, regulates the supply voltage to geared motor 16 in such a manner as to cause actuator 112 to generate on throttle valve 5 a torque $C_T$ exactly equal to torque $C_R$ counteracting throttle valve 5. This is achieved by generating on shaft 133 a torque $C_T'$ designed to balance, in addition to torque $C_R$ of spring 7, the return torque of spring 135. Vehicle speed is thus maintained as set, regardless of whether or not pedal 6 is operated by the user, by virtue of operating torque $C_A$ produced by pedal 6 being replaced by torque $C_T$ produced by actuator 112.

In the event of the vehicle encountering road or environmental conditions causing it to accelerate or slow down in relation to the speed it was traveling at when system 110 was activated, which speed was memorized in register 37 following the first reading of sensor 14 by control unit 113, this is immediately detected by sensor 14, and control unit 113 provides, according to the set program, for varying the control signal of transistor 121 and consequently varying torque $C_T$ as a function of the change in speed. In particular, control unit 113 provides at fixed time intervals (for example, as a function of the clock time of its microprocessor) for increasing the supply voltage of geared motor 16, by increasing the conduction time of transistor 121 and/or by fully disabling it for a time period depending on the difference between the speed reading and the set speed in register 37, and on vehicle acceleration and its derivative, so as to open or close throttle valve 5 by the amount required for maintaining vehicle speed constant and equal to that stored in register 37.

In other words, in the event of vehicle speed increasing (or decreasing), this is immediately detected by control unit 113 comparing the readings of sensor 14; control unit 113 therefore reduces (increases) torque $C_T'$ until it is lower (higher) than the sum of counteracting elastic torques $C_R$ of springs 7 and 135; and throttle valve 5 closes (opens) for reducing (increasing) fuel supply to the vehicle engine, thus maintaining a constant vehicle speed.

During operation of system 110, vehicle 1 may be accelerated voluntarily by the user without disconnecting the system, e.g. for overtaking, by simply depressing pedal 6 in exactly the same way as for system 11. When so operated, pedal 6 functions smoothly, with no discernible stiffness, as though device 110 did not exist. Pressure on pedal 6, in fact, results in rotation of throttle valve 5, which, via transmission 21, is transmitted to arm 132 thus causing it to rotate in the direction of the arrow (FIG. 2). Rotation of arm 132 encounters no resistance by virtue of arm 132 being mounted in idle manner on shaft 133 and therefore free to accompany throttle valve 5, whereas arm 134 and shaft 133 remain stationary to begin with, or are subsequently turned in the opposite direction by return spring 135 upon control unit 113 zeroing the supply voltage to geared motor 16 and consequently also torque $C_T'$. For the same reason, pedal 6 also operates smoothly when device 110 is deactivated or inoperative, by virtue of the mobile part of geared motor 16 remaining stationary and only arm 132 being operated. As this is lightweight and mounted in idle manner on shaft 133, no discernible increase in load is produced on pedal 6.

In the event of braking, this activates sensor 30 which, via control unit 113, opens relay 122 for cutting off supply to geared motor 16 and consequently zeroing torques $C_T'$ and $C_T$, so that vehicle speed again depends on the pressure exerted by the user on pedal 6. The same applies in the case of manual gear shifting (in the absence of an automatic transmission): a shift in gear is detected by control unit 113 continually comparing the information received from instantaneous engine speed sensor 131 and sensor 14, and the vehicle and engine speeds (these obviously being related to the transmission ratio determined by the engaged gear).

Following temporary deactivation of device 110 by sensor 30 or a manual gear shift, the user may choose between reactivating the system as already described, i.e. by pressing button 141 upon the required vehicle speed being reached, thus re-setting register 37; or automatically resetting the speed set prior to deactivating system 110 and memorized in register 37, by pressing reset button 142. This reactivates control unit 113, which supplies actuator 112 by disabling or saturating transistor 121 with a PWM signal such as to generate a suitable torque $C_T$ on throttle valve 5 to bring the speed detected by sensor 14 in line with that memorized in register 37. Finally, with the vehicle running and system 110 connected, the selected cruising speed can be changed using buttons 143 and 144, which provide respectively for accelerating or decelerating the vehicle by respectively increasing or reducing the speed value stored in register 37 and set using buttons 141 and 142. In contrast to operation of pedal 6, however, upon completion of the acceleration/deceleration stage, the new speed value is preserved by control unit 113. It should be pointed out that buttons 143 and 144 may be dispensed with and substituted functionally by buttons 141 and 142, by appropriately programming control unit 113 to determine when it is deactivated (buttons 141 and 142 functioning respectively as set and reset buttons) or activated (buttons 141 and 142 functioning as acceleration and deceleration buttons).

For safety reasons, control unit 113 is so programmed that relay 122, which, like transistor 121, is series connected to the supply circuit of geared motor 16, is kept open in the event of button 141 or 142 being pressed while the vehicle is in low gear or neutral, and the system connected but inoperative (e.g. as a result of braking, gear shifting or operation of switch 36). In other words, actuator 112 is only activated by control unit 113, if a comparison of the sensor 14 and 131 readings shows the fourth or fifth gear is engaged, i.e. suitable transmission ratios for maintaining cruising speed, thus preventing runaway speed of the engine due, for example, to accidental operation of button 142 immediately following temporary disconnection of the system by a braking or gear shift operation.

Figure 5:
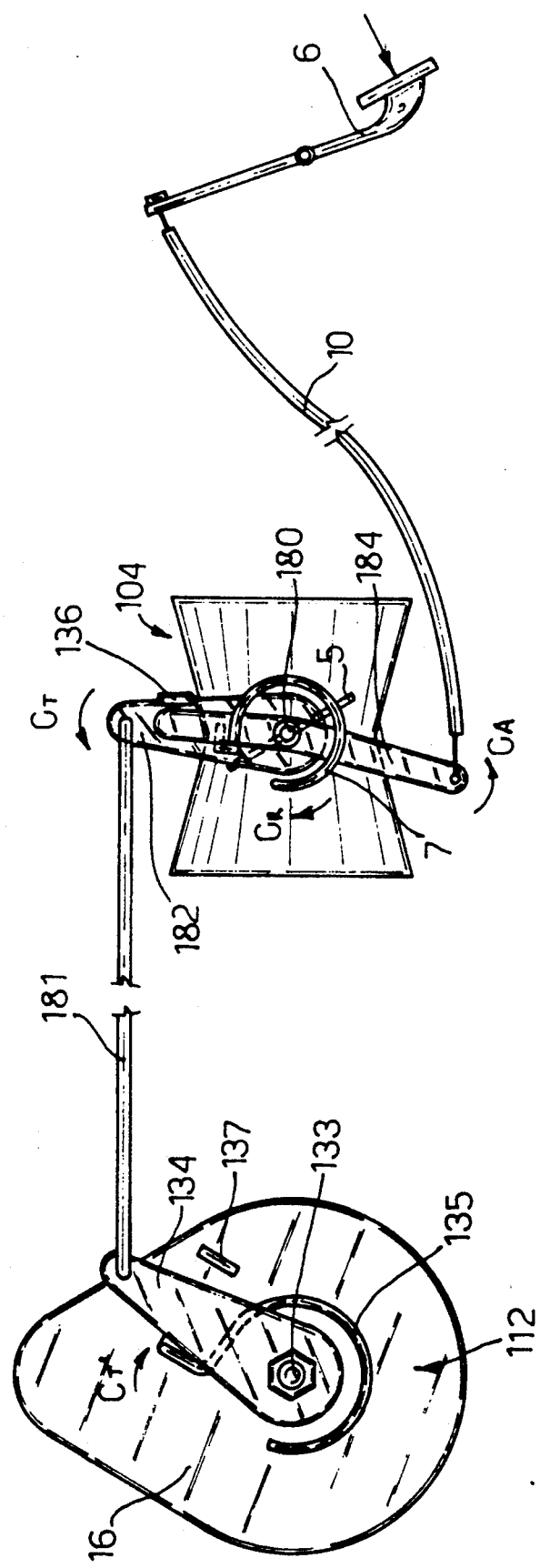
FIG. 5 shows a second embodiment of the mechanical part of the FIG. 3 device.

With reference to FIG. 5, in which any details similar or identical to those already described are shown using the same numbering system, the releasable connection between actuator 112 and throttle valve 5 with linkage 10 and pedal 6 is effected, not directly on output shaft 133 of geared motor 16, but on a shaft 180 supporting throttle valve 5. According to the variation shown in FIG. 5, therefore, shaft 133 is fitted solely with arm 134, which is angularly integral with shaft 133 and connected to return spring 135. Via a known member 181, consisting for example of a rod or Bowden cable, arm 134 is connected to an arm 182 similar to 132 but having an angular lateral shoulder 136 and mounted in idle manner on rotation shaft 180 angularly integral with throttle valve 5. A rocker arm 184 is fitted angularly integral with shaft 180 and, consequently, throttle valve 5, and is connected at one end to linkage 10 and pedal 6 and, at the opposite end, is designed to cooperate with shoulder 136. Return spring 7 acts directly on rocker arm 184.

Operation of the FIG. 5 variation is identical to that described in connection with the FIG. 4 embodiment: when activated by control unit 113, actuator 112 turns arm 134 via shaft 133, which arm 134 operates idle arm 182 via lever 181. As it turns, idle arm 182 turns rocker arm 184 in the same direction via shoulder 136, said rocker arm 184 being located beside and parallel to arm 182 and therefore being subjected, via shoulder 136, to torque $C_T$ in lieu of torque $C_A$. As compared with the FIG. 4 version, when system 110 is deactivated, absolutely no additional load is discernible on pedal 6 as a result of drive 21, over and above the normal load which would be exerted on pedal 6 if the vehicle were not provided with system 110. In fact, operation of pedal 6 results solely in rotation of the assembly consisting of rocker arm 184, throttle valve 5 and shaft 180, which is turned in such a direction as to move rocker arm 184 away from shoulder 136. Idle arm 182, on the other hand, remains stationary together with the assembly consisting of member 181, arm 134 and shaft 133, which remains idle by virtue of the thrust of spring 135 against a fixed limit stop 137 integral with the casing of geared motor 16.

The advantages of the present invention will be clear from the foregoing description. In addition to featuring low-cost components and fairly straightforward electronic control equipment, the system according to the present invention provides for more rapid response to transient states such as acceleration or deceleration of the vehicle. The principal advantage lies in the fact that, even in the event of supply failure to geared motor 16, i.e. with actuator 112 disconnected, the setting of throttle valve 5 may still be controlled effectively and easily by means of pedal 6 (especially in the case of the FIGS. 2 and 3 embodiments) as though system 110 were not installed.

I claim:

1. A system for controlling the speed of a vehicle featuring a feed device having a throttle valve opened by a vehicle accelerator pedal against the action of elastic return means connected to said throttle valve and designed to generate a counteracting elastic torque on the same; characterized by the fact that it comprises an electromechanical actuator designed to continuously generate a variable calibrated torque when the system is activated; and an electronic control unit connected at least to a speed sensor for detecting the instantaneous speed of the vehicle, and designed to vary the torque generated by said actuator; said actuator cooperating with a member connected mechanically to said throttle valve, so as to generate, on said throttle valve, a torque determined by said control unit and in opposition to said counteracting elastic torque.

2. A control system as claimed in claim 1, characterized by the fact that said electromechanical actuator comprises a geared motor designed to generate a torque proportional to its mean supply voltage; said electronic control unit being designed to vary the supply voltage to said geared motor as a function of the vehicle speed detected by said speed sensor.

3. A control system as claimed in claim 2, characterized by the fact that said throttle valve is connected to said electromechanical actuator and said accelerator pedal in such a manner that the torque generated by said electromechanical actuator on said throttle valve acts in the same direction as the torque generated on said throttle valve by operation of said accelerator pedal.

4. A control system as claimed in claim 3, further comprising a first drive member carried by an output shaft of said geared motor and rotationally fixed with respect to said output shaft, a return spring for urging said first drive member against a shoulder fixedly carried by said motor, a second drive member idly carried by said output shaft and connected through a transmission system to said throttle valve and to said acceleration pedal against the action of said return means, and drive means carried by said first drive member and cooperating with said second drive member to drive the second drive member with said output shaft in one predetermined direction only in response to a rotation of said output shaft.

5. A control system as claimed in claim 3, characterized by the fact that it comprises a first drive member mounted angularly fixed with an output shaft of said geared motor and connected to a return spring; a second drive member connected via a transmission system to said first drive member and mounted in idle manner on an angularly fixed rotation shaft of said throttle valve, said second drive member presenting a lateral angular shoulder; and a rocker arm mounted angularly fixed with said rotation shaft of said throttle valve, said rocker arm being connected at one end to said accelerator pedal via a second transmission system and cooperating, at the opposite end, with said shoulder on said second drive member so as to be turned by the same in only one predetermined direction; said return spring of said throttle valve acting directly on said rocker arm.

6. A control system as claimed in claim 3, characterized by the fact that said electromechanical actuator is connected angularly with both said throttle valve and said elastic return means of the same.

7. A control system as claimed in claim 6, characterized by the fact that it also comprises sensors for respectively detecting operation of a vehicle brake and clutch pedals and connected to said control unit; said control unit being designed to disable said electromechanical actuator subsequent to a signal from said sensors.

8. A control system as claimed in claim 7, characterized by the fact that it also comprises a control for turning said control unit on and off, and located inside a passenger compartment of the vehicle; and a memory element designed to store the value of an instantaneous speed of the vehicle when said control unit was last activated by said control; said control unit being designed to read said memory element and to compare the speed value stored in the memory element with that detected by said speed sensor.

9. A control system as claimed in claim 1, characterized by the fact that it comprises a sensor for detecting operation of a brake pedal of the vehicle, and an engine speed sensor, both connected to said control unit, said control unit being designed to de-energize said electromechanical actuator in response to the operation of one of a brake and a transmission of the vehicle, said control unit being designed to detect operation of the transmission by comparing the value detected by said engine speed sensor and that detected by said speed sensor.

10. A control system as claimed in claim 9, characterized by the fact that it comprises a control panel and an on-off control located inside a passenger compartment of the vehicle; and at least one memory register wherein an instantaneous vehicle speed value is stored; said control unit being designed to store in said register the speed value supplied by said speed sensor upon activation of the system via at least one of said control panel and a control, and subsequently to compare said memorized speed value with that detected at each instant by said speed sensor; said control unit also being designed, subsequent to disabling said electromechanical actuator, to read said register subsequent to operation of a first control switch on said panel, or to re-set said register subsequent to operation of a second control switch on said panel and then reactivate said actuator.

11. A control system as claimed in claim 9, characterized by the fact that said control unit selectively energizes and de-energizes said actuator via a control circuit comprising a field-effect power transistor, a relay and a supply circuit of drive means of said actuator, said transistor and said relay both being series connected to said supply circuit.

12. A system for controlling the speed of a vehicle featuring a feed device having a throttle valve opened by a vehicle accelerator pedal against the action of elastic return means connected to said throttle valve and designed to generate a counteracting elastic torque on the same; characterized by the fact that it comprises an electromechanical actuator designed to continuously generate a variable calibrated torque when the system is activated; an electronic control unit connected at least to a speed sensor for detecting the instantaneous speed of the vehicle, and designed to vary the torque generated by said actuator; said actuator cooperating with a member connected mechanically to said throttle valve, so as to generate, on said throttle valve, a torque determined by said control unit and in opposition to said counteracting elastic torque; and a sensor for detecting operation of a brake pedal of the vehicle, and an engine speed sensor, both connected to said control unit; said control unit being designed to de-energize said electromechanical actuator in response to the adjustment of one of a brake and a transmission of the vehicle; said control unit being designed to detect operation of said transmission by comparing the value detected by said engine speed sensor and that detected by said speed sensor; said control unit selectively energizing and de-energizing said actuator via a control circuit comprising a field-effect power transistor, a relay and a supply circuit of drive means of said actuator, said transistor and said relay both being series connected to said supply circuit; said control unit being designed to keep said relay open subsequent to operation of at least one of first and second switches on a control panel, if a comparison of the values detected by said engine speed sensor and said speed sensor shows that the vehicle transmission is set to other than at least one predetermined transmission ratio.

* * * * *